June 3, 1924. 1,496,003
W. K. HOLZMUELLER
FILM DEVELOPING HANGER
Filed May 11, 1923 2 Sheets-Sheet 1
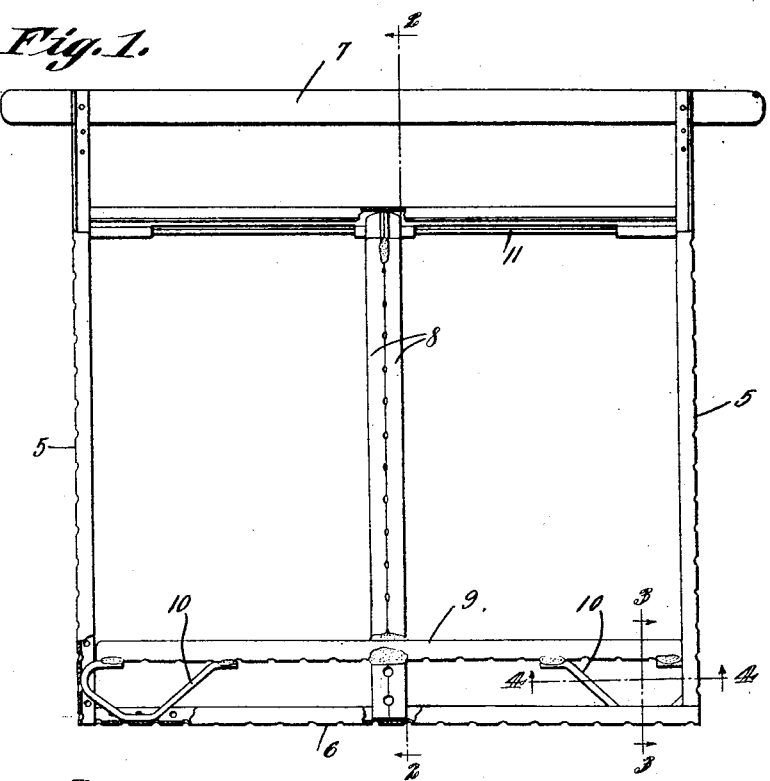
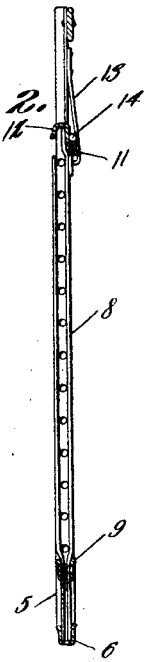
W. K. Holzmueller,
Inventor

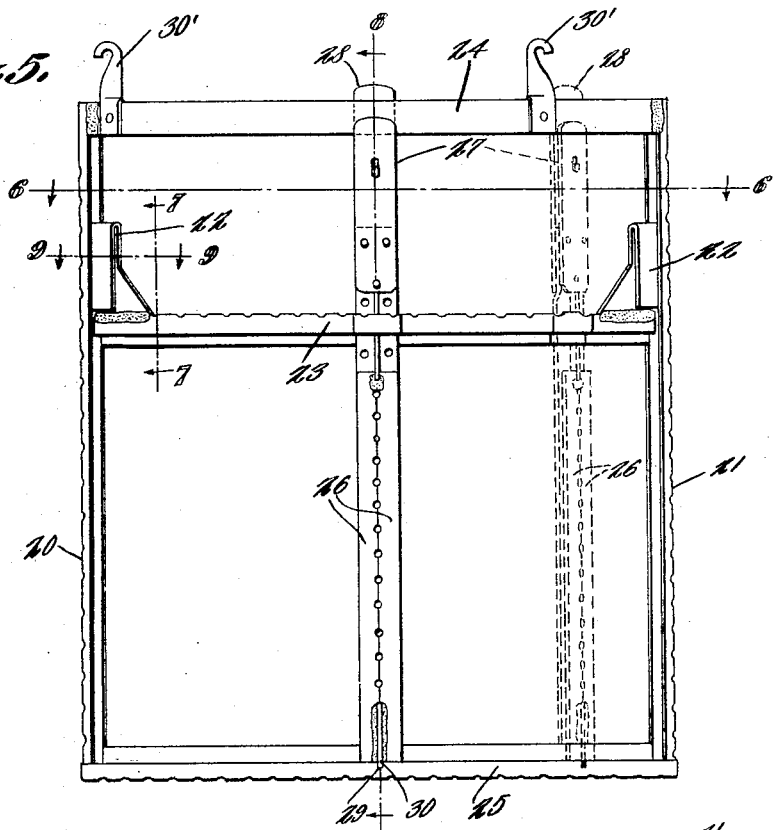
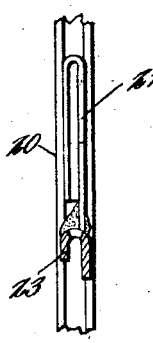
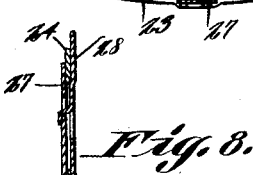
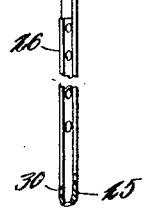

Patented June 3, 1924.

1,496,003

UNITED STATES PATENT OFFICE.

WALTER K. HOLZMUELLER, OF SULLIVAN, ILLINOIS.

FILM-DEVELOPING HANGER.

Application filed May 11, 1923. Serial No. 638,307.

*To all whom it may concern:*

Be it known that I, WALTER K. HOLZMUELLER, a citizen of the United States, residing at Sullivan, in the county of Moultrie and State of Illinois, have invented a new and useful Film-Developing Hanger, of which the following is a specification.

This invention relates to photography and more particularly to a frame especially designed for supporting films during the drying and developing thereof, eliminating finger prints caused by the handling of the film during the developing thereof.

The primary object of the invention is to provide an adjustable frame whereby films of various sizes may be supported by a single frame eliminating the necessity of supplying a multiplicity of frames in the developing of films.

Another object of the invention is to provide a curved frame so that the frames may be employed for use in relatively narrow tanks, thereby reducing the quantity of developing solution to the minimum.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view of a frame constructed in accordance with the invention.

Figure 2 is a sectional view on line 2—2 of Figure 1.

Figure 3 is a sectional view on line 3—3 of Figure 1.

Figure 4 is a sectional view on line 4—4 of Figure 1.

Figure 5 is an elevational view of a modified form of the invention.

Figure 6 is a sectional view taken on line 6—6 of Figure 5.

Figure 7 is a sectional view taken on line 7—7 of Figure 5.

Figure 8 is a sectional view taken on line 8—8 of Figure 5.

Figure 9 is a sectional view taken on line 9—9 of Figure 5.

Referring to the drawings in detail, the frame includes side bars 5, a lower bar 6 and an upper bar 7, the bars 5 and 6 being bent intermediate their side edges to provide supporting grooves to accommodate the edges of films. Supported by the frame is an auxiliary frame embodying opposed bars 8 that are also bent intermediate their side edges to provide grooves for the reception of the side edges of films, a bar 9 being secured to the bars 8, at a point intermediate its ends, to hold the bars 8 in their upright positions.

As shown, the bar 9 is supplied with spring arms 10, the outer ends of which move within the supporting bars of the bars 5, while the lower portions thereof rest in the groove formed in the lower bar 6 to hold the auxiliary frame against movement.

Supported adjacent to the upper end of the main frame is a rod 11 which supports the pivoted clamping member 12 which is formed with a groove adapted to overlie the upper edges of films supported by the auxiliary frame to hold the upper edges of the film in position. In order that the pivoted clamping member will be held against accidental movement, spring arms 13 are provided, which spring arms are secured to the bars 5 and overlie the arms 14 to normally urge the clamping member 12 to its active position.

From the foregoing it will be obvious that by moving the clamping member 12 to a position out of engagement with the bars 8 the films supported by the rack may be readily removed. It might be further stated that when the clamping member is moved to its active position, the upper ends of the bars 8 are clamped and held against movement.

In the form of the invention as shown by Sheet 2 of the drawings, the frame is slightly curved to decrease the width of the frame permitting the same to be employed in connection with relatively narrow tanks. In this form of the invention the side bars 20 and 21 are formed with grooves to accommodate the upwardly extended spring fingers 22 formed at the outer ends of the intermediate supporting bar 23, which supporting bar 23 is also provided with a groove to receive the upper ends of films.

The bar 23 is curved to conform to the curvature of the upper bar 24 and lower bar 25, the lower bar 25 being also formed with a groove to receive the lower ends of films.

Forming a part of the frame is an adjustable central supporting member including bars 26 that have grooves to receive the inner edges of the film supported by the frame, the central supporting member having clamping fingers 27 and 28 at its upper ends to clamp the bar 24 as clearly shown by Figure 5 of the drawings.

The central supporting member extends through openings formed in the bar 23 to hold the bar 23 as well as the central supporting member in their supporting positions, it being understood that by removing the central supporting members from the position as shown by Figure 5 of the drawing, and positioning the same through the opening at one end of the member 23 as shown in dotted lines in Figure 5 of the drawings, the frame may be adapted for supporting films of various widths.

Notches 29 are formed in the bar 24 and receive the extension 30 formed at the lower end of the central clamping member to restrict lateral movement of the central clamping member when the same is in use.

Hooks 30' are secured to the upper bar 24 and provide means to permit the frame to be positioned over a suitable wire allowing the air to contact with both surfaces of the film supported to insure a thorough drying thereof.

It might be further stated that by moving the bar 23 longitudinally of the bars 20 and 21, the frame will be adjusted for supporting films of various lengths, it being understood that the spring fingers 22 that move in the grooves in the bars 20 and 21, frictionally engage the walls of the grooves to restrict movement of the bar 23.

What is claimed as new is:—

1. A film supporting frame including side bars, a lower bar and an upper bar, a bar disposed between the side bars, a vertically adjustable bar supported between the side bars, and said bars having grooves to accommodate the edges of picture films.

2. A film supporting frame including side bars, a lower bar and an upper bar, a bar disposed between the side bars and adapted to be adjusted laterally with respect to the frame, an adjustable bar associated with the central bar and side bars, means for restricting movement of the adjustable bar with respect to the side bar, and said adjustable bar adapted to accommodate the upper edges of the films.

In testimony that I claim the foregoing as my own, I have hereto affixed my signature in the presence of two witnesses.

WALTER K. HOLZMUELLER.

Witnesses:
C. HILL,
CHESTER HORN.